Patented Nov. 30, 1937

2,100,798

UNITED STATES PATENT OFFICE 2,100,798

CONDENSATION PRODUCTS OF CARBENIUM COMPOUNDS AND PROCESS OF PREPARING THE SAME

Walther Dilthey and Ferdinand Quint, Bonn-on-the-Rhine, Germany, assignors to I. G. Farbenindustrie Aktiengesellschaft, Frankfurt-on-the-Main, Germany No Drawing. Application April 27, 1934, Serial No. 722,814. In Germany May 2, 1933

15 Claims. (Cl. 260—54)

The present invention relates to condensation products of carbenium compounds and to a process of preparing them.

We have found that new condensation products of carbenium compounds (compare "Berichte der deutschen chemischen Gesellschaft," 1929, pages 1835 and 1836) are obtainable by treating a compound of the general formula:

I

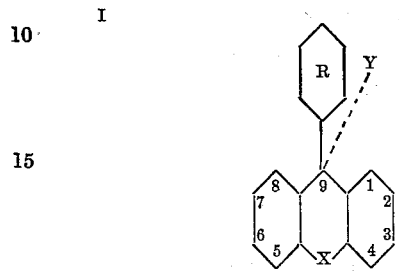

wherein Y represents hydrogen, the hydroxyl group or the radical of an acid. X represents oxygen, sulfur or an NH— or N—aryl group and wherein there is contained a further benzene nucleus condensed in the 7.8-positions of the formula or in ortho-positions of the nucleus R which may contain substituents and a further benzene nucleus may be condensed in the 1.2-positions of the formula, with a hydrogen acceptor, such as oxygen, for instance, in the form of air, or aluminium chloride or zinc chloride in the manner described in the following examples.

By the action of oxygen, aluminium chloride or zinc chloride the substances of Formula I lose hydrogen and undergo an inner ring closure, for instance, probably according to the following formulae:

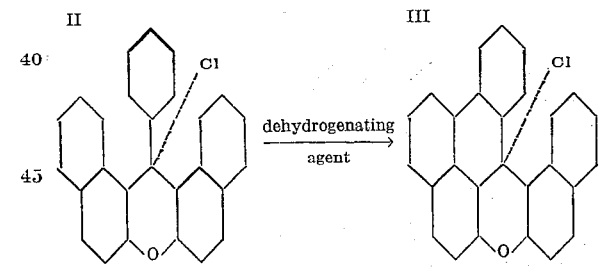

It is also possible that the reaction occurs with double inner ring closure and formation of a product of the following formula:

IV

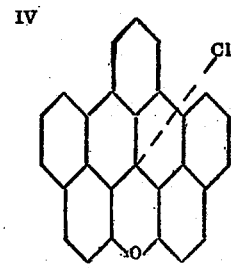

but nothing definite can be said about the constitution of the dehydrogenation product. The dehydrogenation in some cases occurs by itself whereby there is obtained as reaction product the corresponding methane probably according to the following formulae:

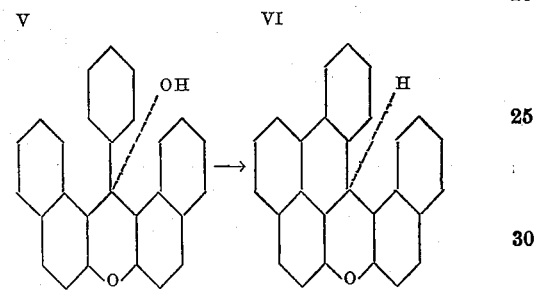

The dehydrogenation always occurs if a suitable hydrogen acceptor is present and is favorably influenced by supply of energy in form of heat or light (sun-light or an artificial source of light). As hydrogen acceptor the most important is oxygen, for instance, in the form of air, but other oxidizing or dehydrogenating agents may also be used, among them, quinone, methylene-blue or ferric salts. It is also possible to effect the dehydrogenation by means of zinc chloride or aluminium chloride. In the case of zinc chloride the better yields are obtained when the carbenium compound is a salt, for instance, a perchlorate, and in the case of aluminium chloride the better yields are obtained when the carbenium compound is a carbinol.

Since the methanes of the compounds of Formula I (wherein Y stands for hydrogen) are easily transformed into the carbinols or their salts by the action of oxidizing agents, there may also be used in the present process the methanes of the carbenium compounds as starting materials.

The salts obtainable according to the new process may be transformed into the corresponding carbinols by means of alkalies. The new products are dyestuffs or intermediate products for the manufacture of dyestuffs. For instance, suitable auxochromic groups may be introduced with formation of dyestuffs, either before or after the dehydrogenation. Nothing definite can be said about the constitution of the final products.

It is also possible, for instance, that during the action of oxygen the latter is absorbed, perhaps with simultaneous dehydrogenation.

The following examples serve to illustrate the invention. The parts are by weight unless stated otherwise.

(1) 8.7 grams of 9-(4-methylphenyl)-dibenzo-xanthenium-chloride of the following formula:

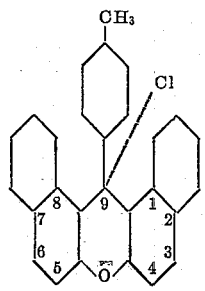

are intimately triturated with 15 grams of aluminium chloride and heated together in a suitable jar on the oil bath. At somewhat above 100° C., the whole melts to a deep-blue mass. The said temperature is maintained until the mass which at first foams violently, is at rest. The temperature is then raised to 200° C., while stirring frequently, and maintained for further two hours. The solidified mass is introduced into 1¼ liters of hot water and dissolved, filtered so as to eliminate a small residue and 500 cc. of fuming hydrochloric acid are added to the hot liquid. The dehydro-9-(4-methylphenyl)-1,2,7,8-dibenzo-xantheniumchloride of the following probable formula:

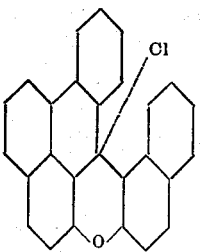

thus obtained, settles after cooling in the form of a fine sludge which is collected on a suction filter made from sintered material and is washed with a mixture of alcohol and ether. A violet powder is obtained. The yield amounts to 6 grams.

(2) 15 grams of 9-phenyl-1,2,7,8-dibenzo-xantheniumperchlorate (cf. Gomberg and Cone, Annalen der Chemie, vol. 370, page 168) are triturated in a mortar with 150 grams of zinc chloride and heated together to about 500° C. for 1½ to 2 hours whereby the mass which foams at first violently, is at rest. The bluish-black melt is purified by boiling it several times with glacial acetic acid. 15 grams of a bluish-black powder probably of the following constitution:

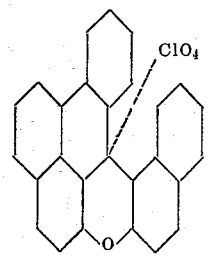

are obtained.

(3) 1 mol. of 9-phenyl-dibenzo-xanthene of the formula:

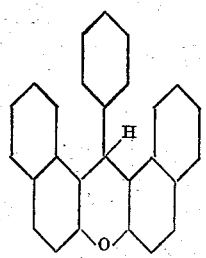

(cf. Claisen, Annalen der Chemie, vol. 237, page 266) is dissolved in such a quantity of glacial acetic acid, mixed with hydrochloric acid, as is just sufficient for dissolution when hot (it is not necessary that the whole is dissolved), and exposed to sunlight while heating to boiling in a reflux apparatus and introducing air or oxygen. The fluorescence which can soon be observed shows the beginning of the reaction which is finished when the thick blue precipitate of the dehydro-9-phenyl-dibenzo-xantheniumchloride probably of the Formula III above.

no longer increases. The yield is nearly quantitative. Artificial light may also be used instead of sunlight.

(4) 5 grams of 9-phenyl-7,8-benzo-xantheniumperchlorate of the formula:

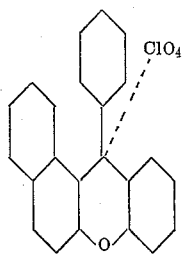

are exposed in a glacial acetic acid solution or suspension to the sunlight or to artificial light and then boiled, oxygen or air being passed through. After some hours the transformation is finished, the yellow salt is completely converted into the brown red crystalline dehydro-9-phenyl-benzo-xantheniumperchlorate, melting at 286° C.

(5) 6 grams of phenyldinaphthoacridine (cf. F. Ullmann and A. Fetvajian, Berichte der deutschen chemischen Gesellschaft, vol. 36, page 1030, —1903—) are mixed with 14 grams of aluminium chloride and heated in the oil bath for 2½ hours to 200° C. After cooling, the melt is extracted by boiling with 750 cc. of water and the new product is precipitated from the solution by means of hydrogen chloride. The yield of dark-red dehydro-phenyldinaphthoacridine-chloride of the following probable formula:

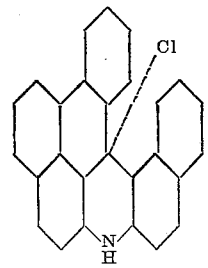

amounts to 5–6 grams.

(6) 6 grams of phenyldinaphtho-acridinium-perchlorate in 450 cc. of nitrobenzene are exposed to direct sunlight until the precipitation of dark-red crystals of perchlorate of the dehydro compound is finished. The yield depends on the duration of the exposure, amounts however easily to 3–4 grams.

(7) A glacial acetic acid solution of N-phenyl-ms-phenyl-1,2,7,8-dibenzo-acridiniumchloride of the following constitution:

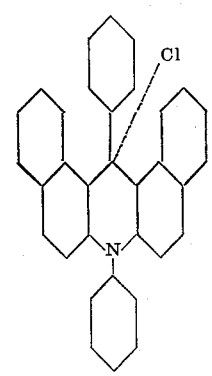

assumes in daylight in the course of several days—rapidly in the sun—a brown-red color whereby the original bright green-yellow fluorescence almost disappears. A test portion is taken from the solution, much diluted with glacial acetic acid and filtered. When the filtrate shows a pale-pink color, the dehydration is finished. The dehydro-N-phenyl-ms-phenyl-1,2,7,8-dibenzo-acridiniumchloride, probably of the following constitution:

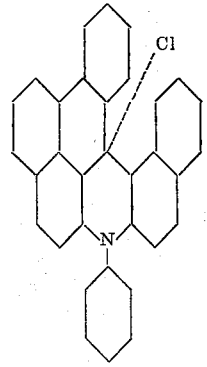

thus obtained, is precipitated with ether. It forms brown dark-brilliant leaflets which, when recrystallized from acetic anhydride, are obtained in the form of orange-red leaflets having a yellow surface-luster. They dissolve very readily in water to an orange-red solution having a fluorescence of the same color which turns greenish-yellow on addition of glacial acetic acid.

(8) 5 grams of ms-naphthyl-xanthenol of the formula:

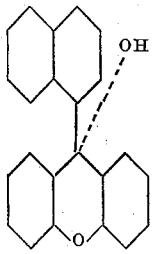

(cf. Chemisches Centralblatt, 1918, vol. I, page 269) are mixed with 10 grams of aluminium chloride and heated in the oil bath for ½ hour to 200° C. The melt is decomposed with water and extracted several times by boiling with water, at last with concentrated hydrochloric acid. A black powder remains which dissolves nearly completely in 750 cc. of benzene. After addition of 500 cc. of glacial acetic acid to the benzene solution, the new perchlorate is precipitated on addition of perchloric acid of 70% strength. The dehydro-ms-naphthyl-xanthenium-perchlorate, thus obtainable, has the following probable constitution:

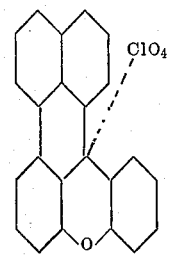

being a black powder which dissolves in glacial acetic acid only to a very small extent to a dirty orange fluorescent solution. By addition of concentrated hydrochloric acid, the solution becomes intensely blue-green whereby the fluorescence turns red.

(9) To a solution of 1 gram of β,β-dinaphthyl-sulfide in 2 grams of benzoyl-chloride 3 grams of aluminium chloride are added in small portions. When the evolution of gas and the foaming, are finished, the whole is heated for a further 1½ hours at 200° C., the bluish-black cooled melt is extracted several times by boiling with water (total quantity 150 cc.) until no more dyestuff dissolves; an equal quantity of glacial acetic acid is added to the solution and the whole is mixed hot with a glacial acetic acid solution of picric acid. On cooling, the dehydro-ms-phenyl-1,2,7,8-dibenzo-thioxanthenium-picrate of the following probable formula:

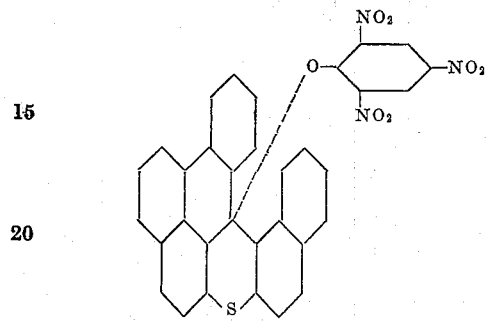

separates in the form of bluish-black needles fine as hair. In order to eliminate the picric acid, the product is washed out by means of ether. The yield amounts to 0.5 gram. The needles dissolve in aqueous acetone, glacial acetic acid, alcohol and concentrated sulfuric acid to a blue solution having a red fluorescence.

(10) 40 parts of para-nitrophenyl-dinaphtho-pyranol of the following formula:

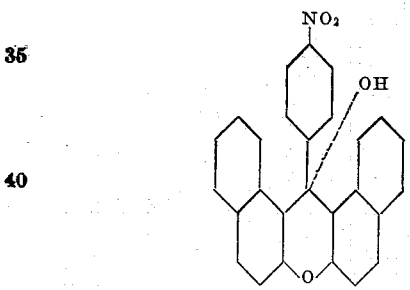

(cf. Dischendorfer and Nesitka, Monatshefte der Chemie, vol. 50, page 27) are introduced at a temperature not exceeding 130° C. into a mixture of 120 parts of aluminium chloride and 30 parts of sodium chloride. After stirring for 5 hours at 130° C. to 150° C., the whole is poured into 2000 parts of water, the whole is heated to boiling, filtered by suction, the residue is extracted by boiling again with 2000 parts of water and the dyestuff obtained is precipitated from the combined red filtrates by means of hydrochloric acid. In order to purify the dyestuff, it may be dissolved in water and again precipitated with hydrochloric acid. The dyestuff thus obtainable, which probably corresponds to the following constitution:

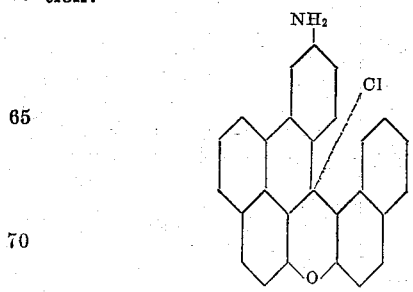

dissolves in water to a wine-red solution and dyes cotton, tanned cotton, loaded and unloaded silk intense red tints of good fastness to light.

(11) 40 parts of m-nitrophenyl-dinaphtho-pyran of the formula:

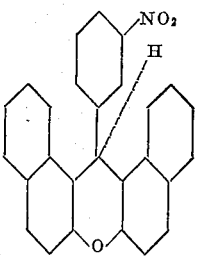

(cf. Dischendorfer, Monatshefte der Chemie, vol. 49, page 140) are introduced at 110° C. to 130° C. into a mixture of 120 parts of aluminium chloride and 30 parts of sodium chloride and, while stirring vigorously, the temperature is maintained for 6 hours at 130° C. The whole is then poured into 3000 parts of water, heated to boiling for about 10 minutes, filtered by suction, the residue is extracted again by boiling with 2000 parts of water and the dyestuff is precipitated from the combined light-green filtrates by means of hydrochloric acid. After extraction by boiling with concentrated hydrochloric acid (37% strength), the hydrochloride of the amine of the following probable formula:

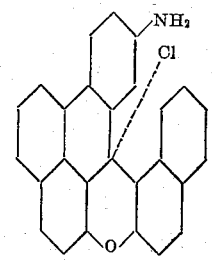

is obtained in the form of a micro-crystalline powder. The dyestuff which is readily soluble in warm water easily dyes cotton and tanned cotton clear green tints which are fast to light and dyes loaded and unloaded silk very clear yellow-green tints of very good fastness to water, washing and to perspiration as well as of a good fastness to light.

We claim:

1. The process which comprises heating at about 500° C. for about two hours a mixture of 9-phenyl-1,2,7,8-dibenzo-xanthenium perchlorate with zinc chloride.

2. The process which comprises heating, while stirring, at about 130° C. to about 150° C. for about 5 hours a mixture of para-nitrophenyl-dinaphtho-pyranol with aluminium chloride and sodium chloride.

3. The process which comprises introducing para-nitro-phenyl-dinaphtho-pyranol into a mixture of aluminium chloride and sodium chloride at a temperature not exceeding about 130° C., heating the whole, while stirring, at about 130° C. to about 150° C. for about 5 hours, and decomposing the reaction mass with water.

4. The process which comprises heating, while stirring, at about 130° C. for about 6 hours a mixture of meta-nitrophenyl-dinaphtho-pyran with aluminium chloride and sodium chloride.

5. The process which comprises introducing meta-nitrophenyl-dinaphtho-pyran into a mixture of aluminium chloride and sodium chloride at a temperature not exceeding about 130° C., heating the whole, while stirring, at about 130° C. for about 6 hours, and decomposing the reaction mass with water.

6. The compound of the following formula:

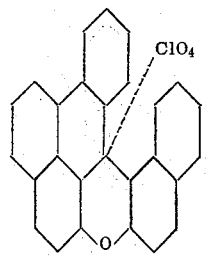

being a bluish-black powder.

7. The compound of the following formula:

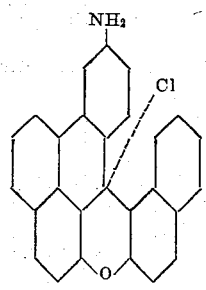

dissolving in water to a wine-red solution and dyeing cotton, tanned cotton, loaded and unloaded silk intense red tints of good fastness to light.

8. The compound of the following formula:

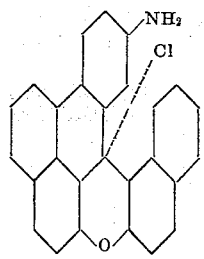

being readily soluble in warm water, dyeing easily cotton and tanned cotton clear green tints which are fast to light and dyeing loaded and unloaded silk very clear yellow-green tints of very good fastness to water, washing and to perspiration as well as of good fastness to light.

9. The process which comprises heating in the presence of an agent of the group consisting of aluminium chloride, zinc chloride, oxygen, quinone, methylene blue and ferric salts, a member of the group consisting of compounds of the general formulae:

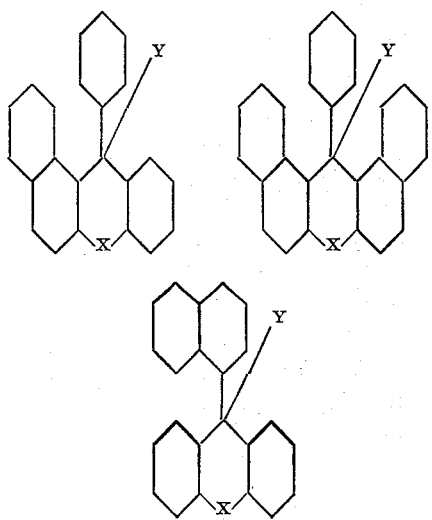

wherein Y represents a member of the group consisting of hydrogen, hydroxyl and the radical of an acid and X represents a member of the group consisting of oxygen, sulfur, imino and arylimino.

10. The process which comprises heating in the presence of aluminium chloride, a member of the group consisting of compounds of the general formulae:

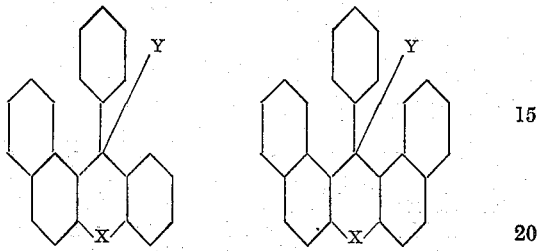

and

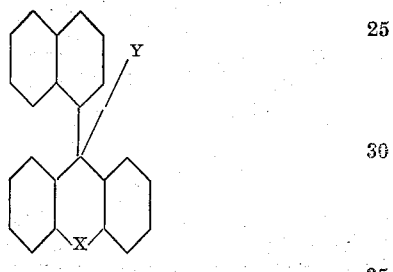

wherein Y represents a member of the group consisting of hydrogen, hydroxyl and the radical of an acid and X represents a member of the group consisting of oxygen, sulfur, imino, and arylimino.

11. The process which comprises heating in the presence of aluminium chloride, a member of the group consisting of compounds of the general formulae:

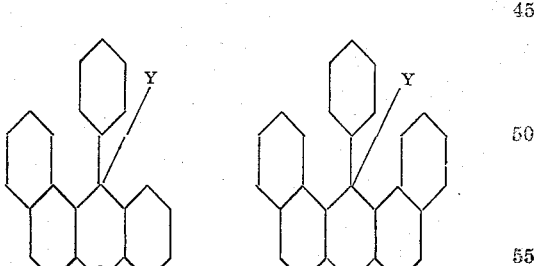

and

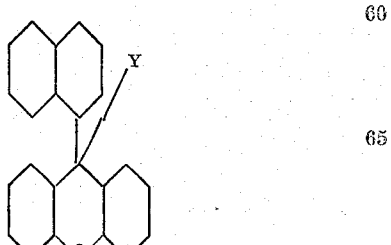

wherein Y represents a member of the group consisting of hydrogen, hydroxyl and the radical of an acid.

12. The process which comprises heating in the presence of aluminium chloride, a compound of the general formula:

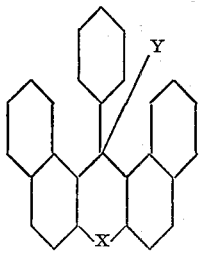

wherein Y represents a member of the group consisting of hydrogen, hydroxyl and the radical of an acid and X represents a member of the group consisting of oxygen, sulfur, imino, and arylimino.

13. The process which comprises heating in the presence of aluminium chloride, a compound of the general formula:

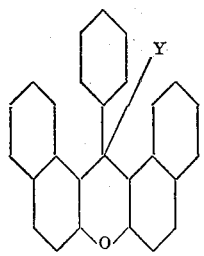

wherein Y represents a member of the group consisting of hydrogen, hydroxyl, and the radical of an acid.

14. The compounds of the general formula:

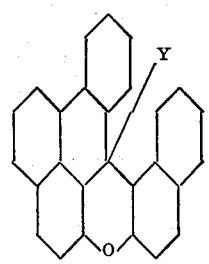

wherein Y represents a member of the group consisting of hydrogen, hydroxyl, and the radical of an acid.

15. The compounds of the general formula:

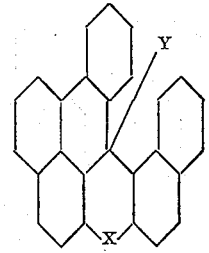

wherein X represents a member of the group consisting of oxygen, sulfur, imino and arylimino and Y represents a member of the group consisting of hydrogen, hydroxyl and the radical of an acid.

WALTHER DILTHEY.
FERDINAND QUINT.